United States Patent

Fukamachi et al.

Patent Number: 5,472,544
Date of Patent: Dec. 5, 1995

[54] METHOD OF PRODUCING WEATHER STRIP WITH METAL CORE

[75] Inventors: Hidetaka Fukamachi; Mitsuhiro Takahara, both of Aichi, Japan

[73] Assignee: Toyoda Gosei Co., Ltd., Japan

[21] Appl. No.: 212,807

[22] Filed: Mar. 15, 1994

[30] Foreign Application Priority Data

Mar. 31, 1993 [JP] Japan ................................ 5-073922

[51] Int. Cl.$^6$ ........................................ B32B 31/00
[52] U.S. Cl. ................... 156/250; 156/272.6; 156/332; 156/274.8
[58] Field of Search ............................. 156/272.6, 62.2, 156/250, 267, 272.2, 332, 274.6, 274.8, 276

[56] References Cited

U.S. PATENT DOCUMENTS

| | | | |
|---|---|---|---|
| 4,396,450 | 8/1983 | Blenner | 156/272.6 |
| 4,836,901 | 6/1989 | Manabe et al. | |
| 5,051,586 | 9/1991 | Sabreen | 156/272.6 |

FOREIGN PATENT DOCUMENTS

| | | |
|---|---|---|
| 0101078 | 6/1982 | Japan . |
| 3253331 | 11/1991 | Japan . |
| 2127713 | 4/1984 | United Kingdom . |

*Primary Examiner*—Chester T. Barry
*Attorney, Agent, or Firm*—Cushman Darby & Cushman

[57] ABSTRACT

A method for producing a rubber based weather strip characterized as containing a metal core and as having a decorating treatment and/or a lubricating treatment applied to a surface of the rubber base which is made of EPDM. The decorating and/or lubricating treatment is effected by adhesively bonding a decorative and/or lubricating member to the surface of the rubber base. The method avoids the need for the conventional buffing step. This results in higher productivity for the production line which lowers costs and improves the work environment due to the absence of buffing dust. This method includes the steps of applying a corona discharge treatment to the surface of the rubber base of EPDM which has previously been subjected to a vulcanizing treatment, with the metal core being grounded, so that polar functional groups are formed in a molecular chain of the EPDM. The decorating treatment and/or the lubricating treatment is then applied to the surface of the rubber base in which the polar functional groups have been formed.

11 Claims, 5 Drawing Sheets

METHOD OF PRODUCING WEATHER STRIP WITH METAL CORE

BACKGROUND OF THE INVENTION

1. Field of the Invention

This invention relates generally to a method of producing a weather strip having a metal core, and more particularly to a method of producing a weather strip that a decorating treatment and/or a lubricating treatment are applied onto a surface of a rubber base made of EPDM (ethylene-propylene-diene copolymer rubber).

2. Related Art

Conventionally, a glass run serving as a weather strip is provided, for example, between a door sash and a window pane of glass in an automobile. Generally, the glass run is formed by EPDM (ethylene-propylene-diene copolymer rubber). In order to enhance sliding properties, a coating of a lubricant, such as silicone and urethane paint, or a flock has been applied to those portions of the glass run disposed in sliding contact with the window pane, and also a non-metallic glass slide-promoting member, such as a sheet made of polyester and a cloth, has been bonded to the sliding-contact portions of the glass run.

Further, for example, in an automobile, a door opening trim (hereinafter referred to as "D.O. trim"), serving as a weather strip for sealing a gap between a body and a door, has been mounted on a peripheral edge portion of a door opening in the automobile body. Generally, this D.O. trim is also formed by EPDM, and prevents rain water, dust, noises and others from intruding into a passenger room of the automobile. EPDM forming the glass run and the D.O. trim is a material having a black color, and hence is unappealing in design. Therefore, a decorative member (e.g. cloth) of a color matching the color tone in the passenger room has heretofore been bonded to a surface of the rubber base.

However, the above-mentioned EPDM contains few if may polar functional groups, and therefore if it is bonded merely by an adhesive, sufficient bonding strength can not be obtained. Therefore, when a glass slide-promoting member is bonded to a surface of the rubber base of the glass run by an adhesive, or a decorative member to the surface of the rubber base of the D.O. trim by an adhesive, the following bonding method has heretofore been adopted. First, a buffing treatment is applied for roughening a surface of the rubber base which has been extruded and vulcanized. Thereafter, the steps of degreasing, coating of a primer, coating of an adhesive, drying, bonding of the above-mentioned glass slide-promoting member and decorative member, and curing of the adhesive are performed. With these sequential treatments, the glass slide-promoting member, the decorative member or the like is bonded to the surface of the rubber base.

According to the above conventional bonding technique, the mentioned treatments must be applied after the vulcanization treatment. This results in a long production line, which results in low productivity and increased costs. Further, dust is produced during the buffing treatment, so that there may be a potential for worsening the work environment. Typical of these art processes are those shown in GB2127713A and Japanese Patent Unexamined Publication No. 3-253331.

SUMMARY OF THE INVENTION

The present invention can resolve the above mentioned problems, and it is an object of the invention to provide a method of producing a weather strip in which a decorating treatment and/or a lubricating treatment can be positively applied to a surface of a rubber base made of EPDM containing a metal core in such a manner that a decorative member and/or a lubricating member are firmly bonded to the surface of the rubber base, without the production of dust, the lowering of productivity and increased costs.

According to the present invention, there is provided a method of producing a weather strip with a rubber base made of EPDM which contains a metal core and to which rubber base surface a decorating treatment and/or a lubricating treatment is applied. A decorative member is adhesively bonded to the surface by the decorating treatment, which method comprises the steps of:

applying a corona discharge treatment by grounding the metal core to the surface of the rubber base of EPDM to which has previously received a vulcanizing treatment, which discharge forms polar functional groups in a molecular chain of the EPDM; and subsequently applying the decorative treatment and/or the lubricating treatment to the surface of the rubber base in which the polar functional groups have been formed, the step of applying the decorative treatment includes the step of bonding the decorative member to the surface of the rubber base.

In the above method, the rubber base made of EPDM is stabilized by passing through the vulcanizing treatment. Then the corona discharge treatment is applied to the surface of the rubber base by grounding the metal core. By this corona discharge treatment, polar functional groups are formed in a molecular chain of the EPDM on the surface of the base. It is thought that the thus produced polar functional groups are carbonyl groups and carboxyl groups. The formation of these groups is thought to occur as follows. The energy of the electrons produced by the corona discharge results in the partial dissociation of the carbon and the hydrogen atom bonds which form radicals, and also in the production of a large amount of ozone. Then, it is speculated that instead of addition to the dissociated hydrogen atoms (radicals), the oxygen atoms separate from the ozone in the unstable state and add to the carbon atoms (radicals).

Then, the decorative member and/or the lubricating member are adhesively bonded to the surface of the rubber base containing the formed polar functional groups, thus effecting the decorating treatment and/or the lubricating treatment. Therefore, the decorative member such as a cloth and the adhesive for bonding the decorative member are firmly bonded through the intermolecular bond of the polar functional groups, and also the lubricating member such as a flock and the adhesive for bonding the lubricating member are also firmly bonded through the intermolecular bond of the polar functional groups.

The production process of the invention requires fewer steps than the conventional process which results in a shorter production line. Further, due to the corona discharge treatment, a buffing treatment is not needed, and therefore there is no production of dust or the like.

DETAILED DESCRIPTION OF THE PREFERRED EMBODIMENTS

First Embodiment

A first embodiment of the present invention will now be described with reference to FIGS. 1 to 4.

Figure 2:
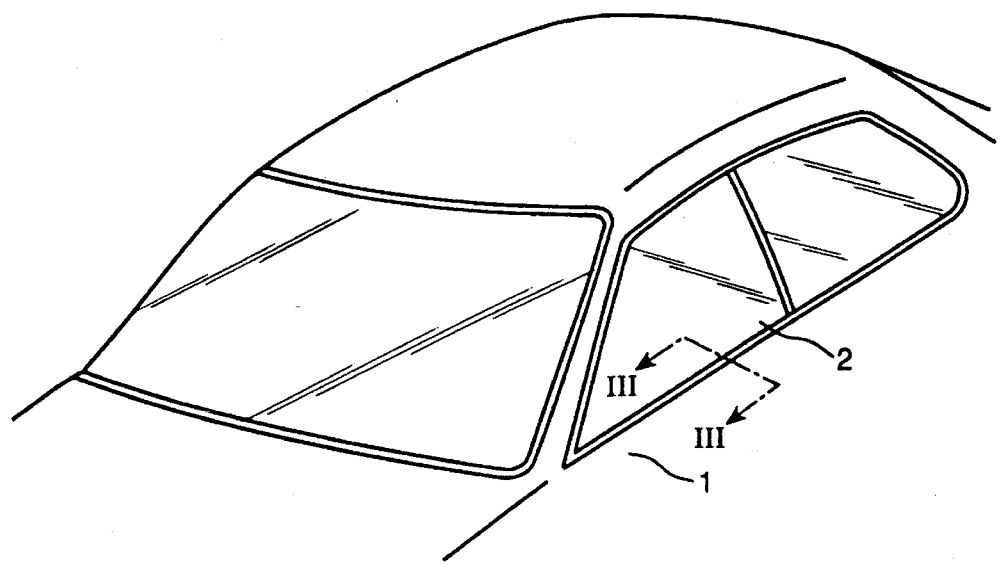
FIG. 2 is a perspective view of a portion of an automobile, showing a mounting portion of the inner glass run or the like of the first embodiment.
Figure 3:
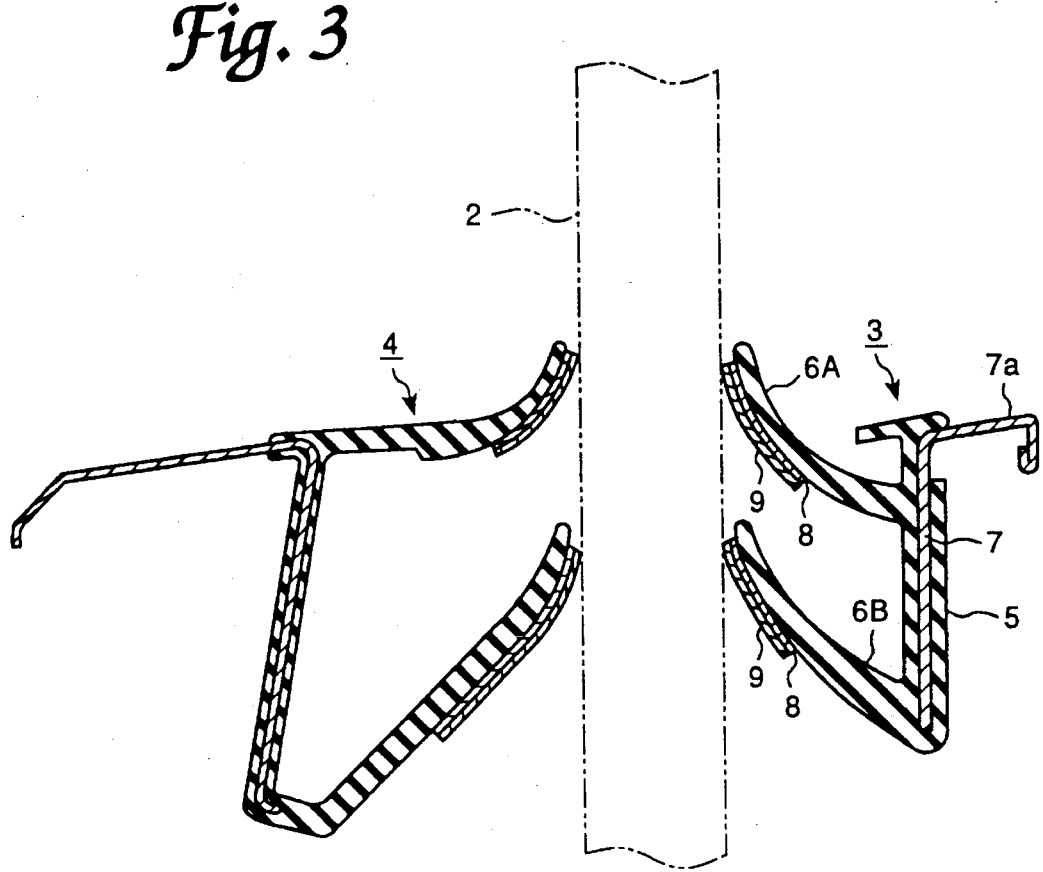
FIG. 3 is a cross-sectional view taken along the line III—III of FIG. 2, showing the inner glass run and outer glass run of the first embodiment.

An inner glass run 3 and an outer glass run 4, which serve as weather strips, are mounted on a generally central portion of a door 1, that is, a belt line portion where a door glass pane 2 is in sliding contact with these glass runs, as shown in FIGS. 2 and 3. The both glass runs 3 and 4 are of generally the same shape, and therefore only the inner glass run 3 will be described hereafter. The inner glass run 3 includes a body 5, and a pair of upper and lower lips 6A and 6B extending from the body 5 toward the door glass pane 2. The body 5 and the lips 6a and 6B are formed by a rubber base made mainly of EPDM. Here, the EPDM includes ethylene, propylene, and a trace amount of non-conjugated diene as a third component, such as ethylidene norbornene, dicyclopentadiene and 1,4-hexadiene. These are copolymerized to introduce double bonds to side chains, and is finally passed through sulfur vulcanization. Additives, such as a reinforcing filler (carbon black or a white filler), a plasticizer, a lubricant and a vulcanizing agent, may be added to this EPDM.

A metal insert 7 serving as a metal core is provided in the body 5 so as to secure the rigidity of the body 5. For a mounting reason or for decorative purposes, an end portion 7a of the insert 7 is exposed to a passenger room of a car, as shown at a right side of FIG. 3. A flock is given to that side or surface of a distal end portion of each of the lips 6A and 6B which is disposed in sliding contact with the door glass pane 2, thus applying a lubricating treatment. More specifically, a flock layer 9 is secured to the above sliding contact surface through an adhesive layer 8. The flock layer 9 is held in contact with the door glass pane 2, and therefore the door glass pane 2 can smoothly move vertically relative to each lip.

A system for producing the inner glass run 3 will now be described.

Figure 1:
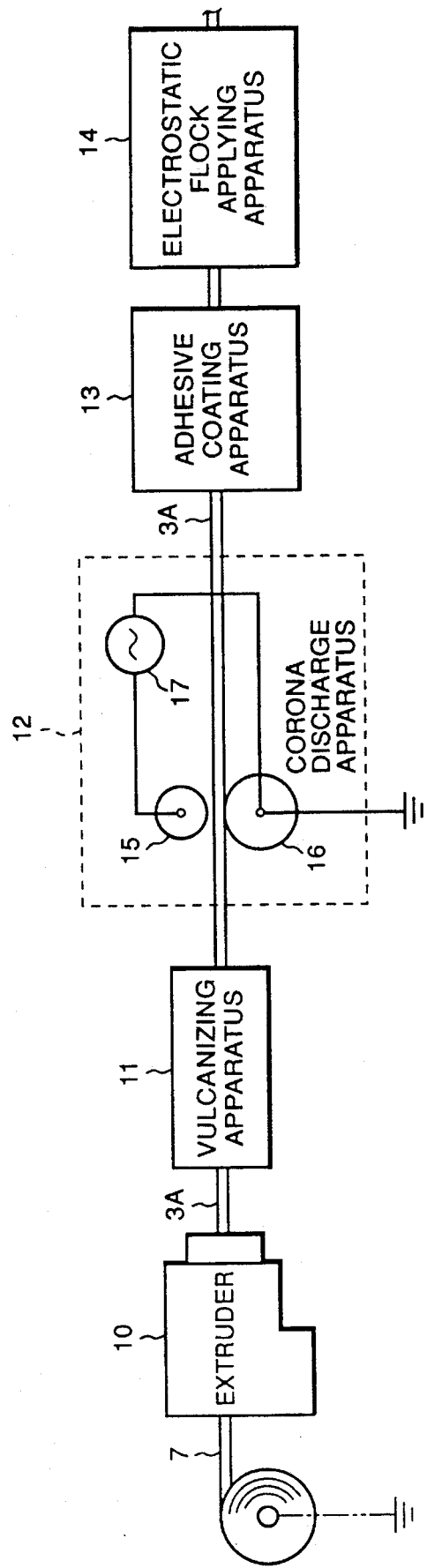
FIG. 1 is a schematic view of a system for producing an inner glass run and the like according to a first embodiment of the present invention.

As shown in FIG. 1, this producing system provides with an extruder 10, a vulcanizing apparatus 11, a corona discharge apparatus 12, an adhesive coating apparatus 13, and an electrostatic flock-applying apparatus 14.

The extruder 10, the vulcanizing device 11, the adhesive coating device 13 and the electrostatic flock-applying device 14 are of a conventional construction, and therefore explanation thereof will be omitted.

Figure 4:
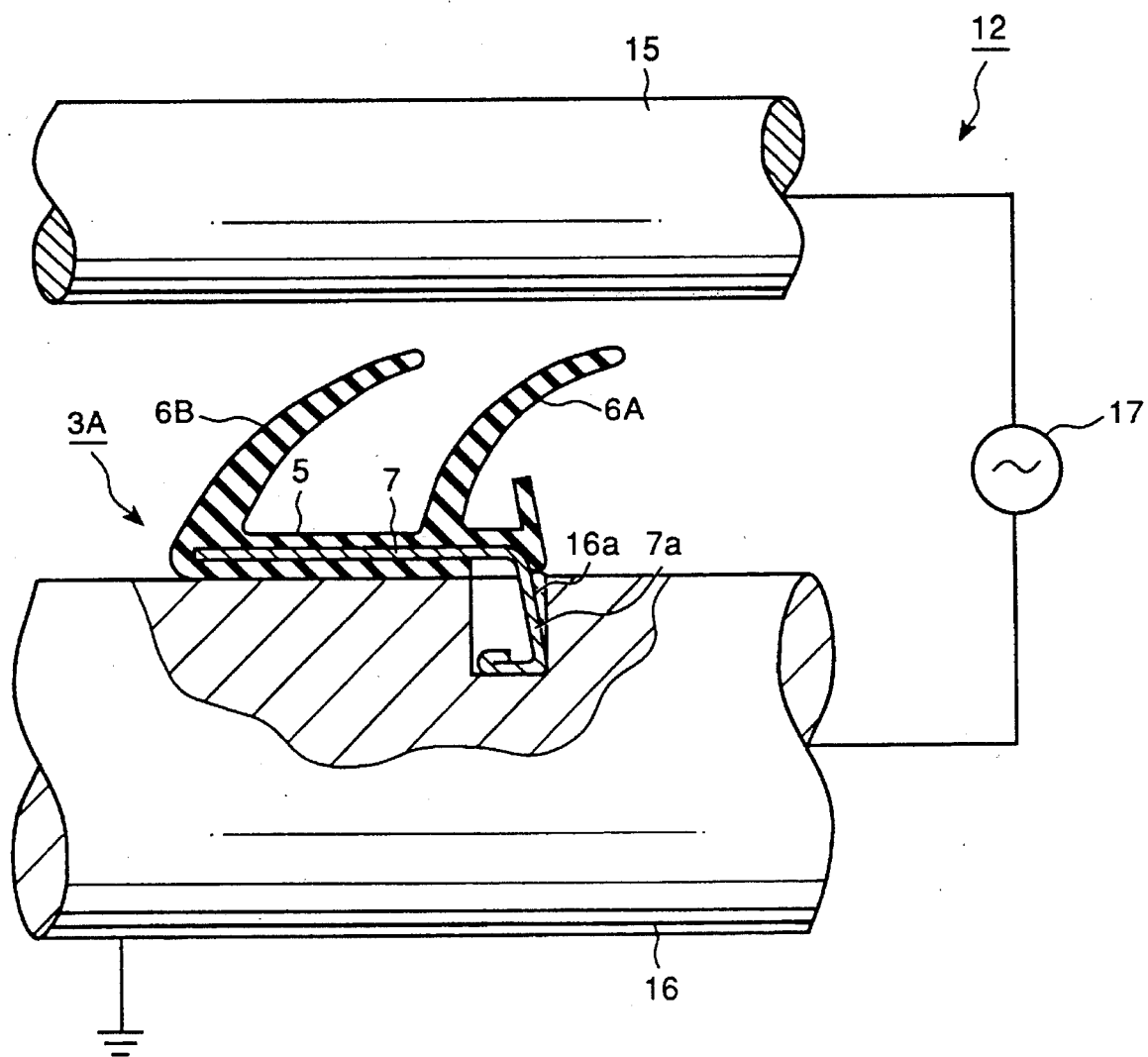
FIG. 4 is a partly cross-sectional view of a corona discharge device used in the first embodiment.

The corona discharge device 12 provides with a corona discharge electrode 15, a metal roller 16 disposed in opposed relation to the corona discharge electrode 15, and a high-frequency oscillator 17, as shown in FIG. 4. The high-frequency oscillator 17 applies high voltage between the electrode 15 and the metal roller 16, thereby causing a corona discharge. A dielectric coating (not shown) is formed on an outer periphery of the corona discharge electrode 15. In this embodiment, the metal roller 16 is connected to the ground or earth. A recess 16a for receiving the end portion 7a of the insert 7 is formed in a portion of the surface of the metal roller 16. In the corona discharge device 12, the insert 7 is brought into contact with the metal roller 16, with the end portion 7a received in the recess 16a, so that the insert 7 is grounded. If the insert 7 is beforehand grounded in the production process as indicated by a dots-and-dash line in FIG. 1, the recess 16a is not always necessary.

When the method of producing the inner glass run 3 in this embodiment is carried out, the operation thereof will now be described as follows.

First, as shown in FIG. 1, a material of the insert 7 is supplied to the extruder 10, and at the same time unvulcanized EPDM is supplied from a rubber material supply device (not shown) to the extruder 10. An extrudate 3A, which has the insert 7 and the shape of the inner glass run 3, is formed by the extruder 10.

Then, the extrudate 3A is fed to the vulcanizing device 11. The unvulcanized EPDM is vulcanized at this vulcanizing step.

Then, the thus vulcanized extrudate 3A is fed to the corona discharge device 12. More specifically, as shown in FIG. 4, the extrudate 3A is caused to pass between the corona discharge electrode 15 and the metal roller 16, with the lips 6A and 6B directed toward the corona discharge electrode 15. At this time, the distance between the surface of the lips 6A and 6B and the corona discharge electrode 15 should be at least 1.0 mm to 5.0 mm. The high-frequency oscillator 17 applies high voltage (The output voltage is 0.7 kW in this embodiment in the case where the extrusion rate is 10 m/min.) between the corona discharge electrode 15 and the metal roller 16. Also, at this time, the end portion 7a of the insert 7 is received in the recess 16a in the metal roller 16, so that that side or face of the extrudate 3A reversed to the lips 6A and 6B is completely held in contact with the metal roller 16. At this time, the end portion 7a of the insert 7 is always held in contact with a portion of the surface of the recess 16a.

Therefore, during the passage of the extrudate 3A between the corona discharge electrode 15 and the metal roller 16, a corona field is produced between the insert 7 and the corona discharge electrode 15, so that that portion of the rubber base disposed therebetween is exposed to this corona field. The surfaces of the distal end portions of the lips 6A and 6B for sliding contact with the door glass pane 2 are subjected to a corona discharge. As a result, at these sliding contact surfaces, polar functional groups such as a carbonyl group and a carboxyl group are formed in a molecular chain of the EPDM.

Then, the extrudate 3A passed through the corona discharge step is fed to the adhesive coating device 13. An adhesive having polarity is coated by this adhesive coating device 13 onto the sliding contact surfaces of the lips 6A and 6B in which the polar functional groups have been formed.

The extrudate 3A thus coated with the adhesive is fed to the electrostatic flock-applying device 14. In this device 14, a number of pile elements are caused to drop from a pile supply source (not shown) to those portions of the lips 6A and 6B coated with the adhesive. At this time, voltage is applied between the adhesive and the pile supply source, so that a number of pile elements deposited on the adhesive are secured thereto by electrostatic planting. At this time, the adhesive has not yet been cured, and hence is in the viscous state. Thereafter, the adhesive is cured by heating. As a result of this curing by heating, the adhesive layer 8 and the flock layer 9 are formed. At this time, since the polar functional groups have been formed in the sliding contact surfaces of the lips 6A and 6B, these sliding contact surfaces and the adhesive are firmly joined to each other through the intermolecular bond between the polar functional groups of the sliding contact surfaces and the polar functional groups of the adhesive.

Finally, the extrudate 3A thus provided with the flock is fed to a cutting device (not shown). The planted pile elements are cut into a predetermined length, and the extrudate 3A is cut into a predetermined length by this cutting device, thereby producing the inner glass run 3.

In the thus produced inner glass run 3, since the polar functional groups are formed in the sliding contact surfaces of the lips 6A and 6B for sliding contact with the door glass pane 2, these sliding contact surfaces are firmly connected to the adhesive layer. Therefore, the flock layer 9 will never separate or peel. Thus, the lubricating treatment can be positively applied.

In this embodiment, a buffing treatment, which has been an indispensable step in the prior art techniques, can be omitted, and therefore dust and the like produced by such a buffing treatment is eliminated.

Furthermore, in this embodiment, in contrast with the prior art techniques requiring many steps including a buffing step and a primer coating step, the number of the steps of the production process is reduced. Therefore, the production efficiency is enhanced, and the production cost is reduced.

In this embodiment, there is produced the inner glass run 3 having the insert 7 and exposing the end portion 7a of this insert 7. Therefore, by electrically connecting the insert 7 to the metal roller 16, the insert 7 can be grounded. Compared with the type of weather strip not provided with such an insert 7, the distance between the corona discharge electrode 15 and the metal roller 16 can be shorter. As a result, even if the voltage applied by the high-frequency oscillator 17 is set to a somewhat lower level, a sufficient corona discharge can be obtained, and thereby the cost of electric power can be reduced.

In this embodiment, although the inner glass run 3 has been described in detail, the same production method as described above can also be applied to the outer glass run 4.

Second Embodiment

A second embodiment of the present invention will now be described. Explanation of those portions of the second embodiment corresponding to those of the first embodiment will be omitted or given briefly.

Figure 6:
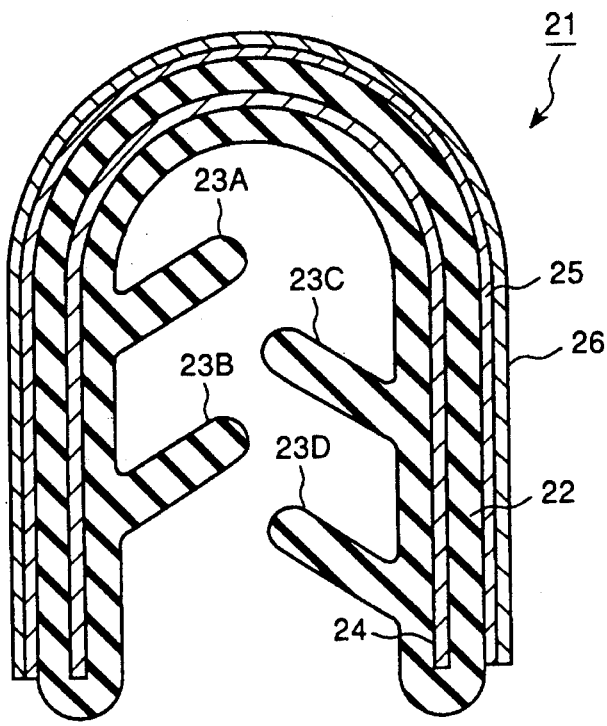
FIG. 6 is a cross-sectional view of the door trim of the second embodiment.

The second embodiment is directed to a door trim 21 (shown in FIG. 6) serving as a weather strip for mounting at a door opening of a body of an automobile. The door trim 21 has a body 22 of a U-shaped cross-section, as shown in FIG. 6. The body 22 has a plurality of lips 23A, 23B, 23C and 23D integrally formed on and extending inwardly from an inner surface thereof. The inner side of the body 22 is fitted on a flange or the like formed on the automobile body, and is retained thereto by pressing the lips 23A to 23D against this flange because of their resilient restoring forces.

A metallic insert 24 serving as a metal core is embedded in the body 22. A cloth 26 of polyester fibers serving as a decorative member is bonded to the outer surface of the body 22 by putting an adhesive film 25 of a polyester therebetween. The cloth 26 enhances the design of the door trim 21.

An apparatus for producing the door trim 21 will now be described.

Figure 5:
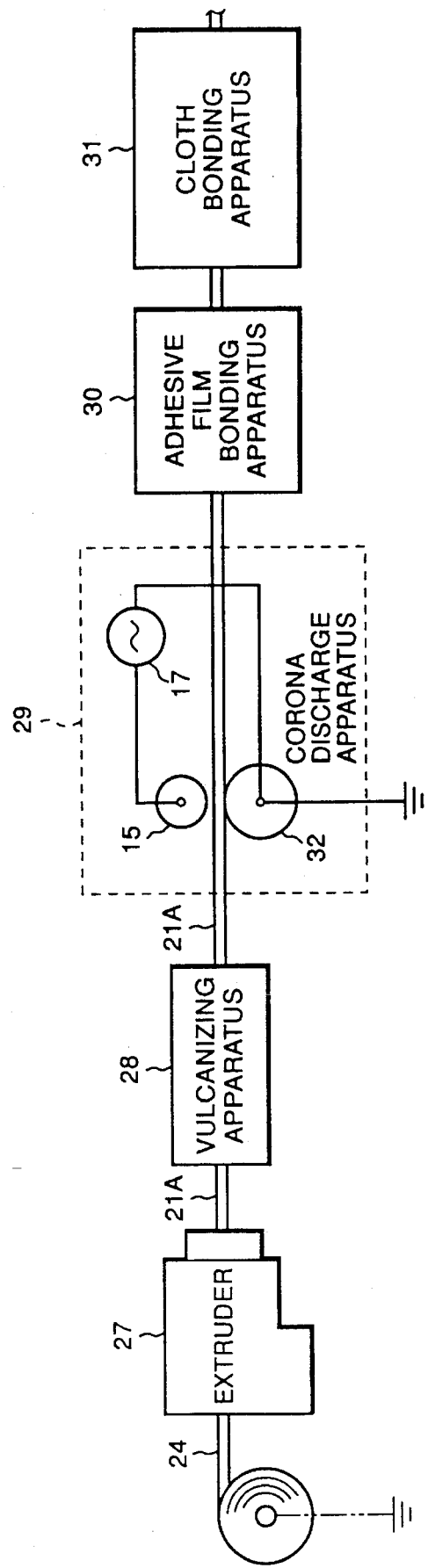
FIG. 5 is a schematic view of a system for producing a door trim according to a second embodiment of the present invention.

This production system has an extruder 27, a vulcanizing device 28, a corona discharge device 29, an adhesive film bonding device 30, and a cloth bonding device 31, as shown in FIG. 5.

As in the first embodiment, the extruder 27 and the vulcanizing device 28 are of a conventional construction, and therefore explanation thereof will be omitted. The adhesive film bonding device 30 has the function of adhering the tape-like adhesive film 25 to a predetermined position. The cloth bonding apparatus 31 has the function of adhering the cloth 26 onto the adhesive film 25 and of joining them together by heat fusion. The adhesive film 25 and the cloth 26 may be replaced by the type of structure in which such adhesive film and cloth are beforehand joined to each other by heat fusion.

Figure 7:
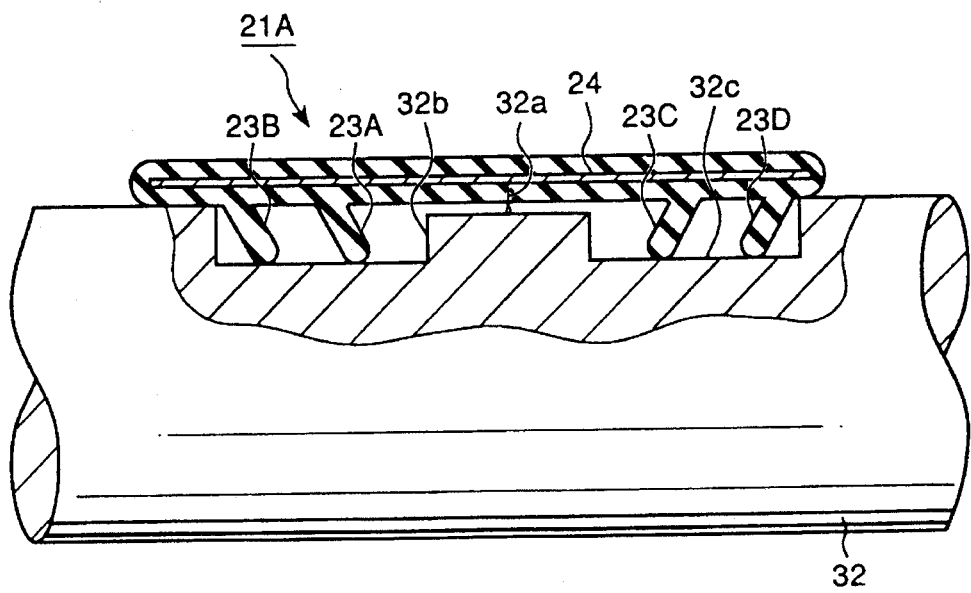
FIG. 7 is a partly cross-sectional view of a corona discharge device used in the second embodiment, mainly showing a metal roller.

This second embodiment differs greatly from the first embodiment in that in the corona discharge apparatus 29, a plurality of needles 32a are formed on and projected from a portion of a metal roller 32, as shown in FIG. 7. More specifically, during the passage of an extrudate 21A (later described) over the metal roller 32, the needles 32a prick a rubber base, and the metal roller 32 and the insert 24 are electrically connected to each other by the needles 32a. The metal roller 32 has recesses 32b and 32c capable of receiving the lips 23A to 23D. If the insert 24 is grounded beforehand at the extrusion step as in the first embodiment, the same condition is obtained without the use of the needles 32a.

When the method of producing the door trim 21 in this embodiment is carried out, the operation thereof will now be described as follows.

First, as shown in FIG. 5, while a material of the insert 24 is supplied to the extruder 27, unvulcanized EPDM is supplied from a rubber material supply device (not shown) to the extruder 27. An extrudate 21A, which has the insert 24 therein and the shape of the door trim 21, is formed by the extruder 27. Then, the extrudate 21A is fed to the vulcanizing apparatus 28, and the EPDM is vulcanized.

Then, the thus vulcanized extrudate 21A is fed to the corona discharge device 29. More specifically, the extrudate 21A is caused to pass between a corona discharge electrode 15 and the metal roller 32, with the lips 23A to 23D received in the recesses 32b and 32c, as shown in FIG. 7. At this time, the distance between that surface of the extrudate 21A reversed to the lips 23A to 23D and the corona discharge electrode 15 should be at least 2.0 mm to 5.0 mm. A high-frequency oscillator 17 applies high voltage (The output voltage is 0.7 kW in this embodiment) between the corona discharge electrode 15 and the metal roller 32.

Therefore, when the extrudate 21A passes over the metal roller 32, the needles 32a on the metal roller 32 prick the rubber base, so that these needles 32a electrically connect the metal roller 32 to the insert 24. Therefore, a corona field is produced between the insert 24 and the corona discharge electrode 15, so that that portion of the rubber base disposed therebetween is exposed to this corona field. That surface of the extrudate 21A reversed to the lips 23A to 23D, is subjected to a corona discharge. As a result, in this surface, polar functional groups such as a carbonyl group and a carboxyl group are formed in a molecular chain of the EPDM.

Then, the extrudate 21A passed through the corona discharge step is fed to the adhesive film bonding apparatus 30. The adhesive film 25 having polarity is bonded by this adhesive film bonding apparatus 30 to that surface of the extrudate 21A in which the polar functional groups have been formed.

Then, the extrudate 21A, having the adhesive film 25 adhered thereto, is fed to the cloth bonding apparatus 31. In this apparatus 31, the cloth 26 is bonded to the adhesive film 25. At this time, the adhesive film 25 is heated, and the cloth 26 is bonded thereto by heat fusion. Thus, the cloth 26 is bonded by putting the adhesive film 25 therebetween to that surface of the extrudate 21A in which the polar functional groups have been formed. Since the polar functional groups have been formed in this surface portion, this surface portion and the adhesive film 25 are firmly joined to each other through the intermolecular bond between the polar functional groups of this surface portion and the polar functional groups of the adhesive film.

Finally, the extrudate 21A having the cloth 26 bonded thereto is fed to a cutting apparatus (not shown). The extrudate 21A is cut into a predetermined length by this cutting apparatus, thereby producing the door trim 21.

In the door trim 21 thus produced, the polar functional groups are formed in the above-mentioned surface portion, which results in the adhesive film 25 being firmly bonded to this surface portion. The cloth 26, accordingly, will not separate or peel, and thereby fully achieves a decorative performance, and maintains an excellent design.

In this embodiment as in the first embodiment, dust and the like produced by a buffing treatment is eliminated, which results in the number of the steps of the production process being reduced, and therefore there can be achieved excellent advantages that the production efficiency is enhanced and that the production cost is reduced.

In this embodiment, the needles 32a are provided on the metal roller 32, and the metal roller 32 is electrically connected to the insert 24 embedded in the body 22. Therefore, in the production of the door trim 21 having the insert 24 which is not exposed (This embodiment differs also in this respect from the first embodiment), the corona discharge treatment can also be applied thereto.

The present invention is not limited to the above embodiments, and modifications as described below can be made without departing from the scope of the present invention.

(1) In the first embodiment, although as the means for applying the lubricating treatment, there is adopted the construction in which the flock layer 9 is provided by putting the adhesive layer 8 therebetween, there may be adopted another construction in which a lubricating member such as a cloth and a sheet is bonded by putting the adhesive layer 8 therebetween.

(2) In the first embodiment, although the lubricating treatment is applied to the lips 6A and 6B of the inner and outer glass runs 3 and 4, the lubricating treatment may be applied to lips or the like of other glass runs requiring such a lubricating treatment.

(3) In the second embodiment, although the cloth 26 serving as the decorative member is bonded by putting the adhesive film 25 of a polyester therebetween, the adhesive film 25 may be made of any other suitable material in so far as it has polarity. Examples of such material include nylon, polyethylene, polypropylene, polyvinyl alcohol, polyvinyl chloride, polyvinylidene chloride, ethylene-vinyl alcohol copolymer, and ionomer. The adhesive film 25 may be replaced by an ordinary adhesive. Furthermore, as the decorative member, a cloth made of any of the above-enumerated materials may be used, and also any other suitable sheet-like material such as a metallic foil or film may be used.

(4) Although the lubricating treatment is effected in the first embodiment whereas the decorating treatment is effected in the second embodiment, the present invention may be so embodied as to include both of the two treatments.

(5) As mentioned above in the first and second embodiments, it is only necessary that the metal core should be grounded during the shaping process, that is, before the corona discharge treatment is carried out.

As described in detail, in the methods of producing the weather strip with the metal core, the bonding of the decorative member and/or the lubricating member is firm, and the decorating treatment and the lubricating treatment can be positively applied thereto. And besides, there can be achieved an excellent advantage that there is a reduction in the production of dust, along with the increased productivity and a lowering of the cost.

What is claimed is:

1. A method of producing a weather strip characterized as having a decorating member attached to a surface of a rubber base which contains a metal core comprising, supplying a weather strip characterized as having a rubber base made of ethylene-propylene-diene copolymer (EPDM) and as containing a metal core;

applying a corona discharge treatment to a surface of said rubber base of EPDM which has been subjected to a vulcanizing treatment, with said metal core being grounded, under conditions so that polar functional groups are formed in a molecular chain of said EPDM; and applying a decorative treatment to said corona discharge treated surface of said rubber base in which said polar functional groups have been formed.

2. A method of producing a weather strip characterized as having a lubricating member attached to a surface of a rubber base which contains a metal core comprising, supplying a weather strip characterized as having a rubber base made of ethylene-propylene-diene copolymer (EPDM) and as containing a metal core;

applying a corona discharge treatment to a surface of said rubber base of EPDM which has been subjected to a vulcanizing treatment, with said metal core being grounded, under conditions so that polar functional groups are formed in a molecular chain of said EPDM; and applying a lubricating treatment to said corona discharge treated surface of said rubber base in which said polar functional groups have been formed.

3. A method of producing a weather strip characterized as having a decorating member and a lubricating member attached to a surface of a rubber base which contains a metal core comprising, supplying a weather strip characterized as having a rubber base made of ethylene-propylene-diene copolymer (EPDM) and as containing a metal core;

applying a corona discharge treatment to a surface of said rubber base of EPDM which has been subjected to a vulcanizing treatment, with said metal core being grounded, under conditions so that polar functional groups are formed in a molecular chain of said EPDM; and applying a decorative treatment and a lubricating treatment to said corona discharge treated surface of said rubber base in which said polar functional groups have been formed.

4. A method according to claim 1, 2 or 3 in which said metal core is grounded at the step of supplying said rubber base.

5. A method according to claim 1, 2 or 3 in which said corona discharge treatment involves applying high voltage between a corona discharge electrode and a metal roller which is grounded, which metal roller is disposed in an opposed relation to said electrode.

6. A method according to claim 1, 2 or 3, in which said metal core is substantially completely embedded in said rubber base, and said corona discharge treatment is carried out by piercing needles, formed on and projected from a surface of said metal roller, into said rubber base to cause said needles to be electrically connected to said metal core.

7. A method according to claim 1, 2 or 3 in which the grounding of said metal core is effected until the step of said corona discharge treatment.

8. A method according to claim 2 or 3, where said lubricating treatment involves coating an adhesive having polarity to said surface of said rubber base in which said polar functional groups have been formed, planting a number of pile elements on said adhesive, and cutting said planted pile elements to a predetermined length.

9. A method according to claim 1 or 3, where the decorative treatment involves bonding an adhesive film having polarity to said surface of said rubber base in which said polar functional groups have been formed, and then bonding a cloth to said adhesive film.

10. A method according to claim 9, in which said adhesive film comprises a polyester material having polarity, and said cloth is made of polyester fibers.

11. A method according to claim 1 or 3, where the decorative treatment involves bonding an adhesive film having polarity to said surface of said rubber base in which said polar functional groups have been formed, and then bonding a sheet-like material, which contains a metallic foil and a resin film, to said adhesive film.

* * * * *